(12) United States Patent
Alhat et al.

(10) Patent No.: US 10,570,690 B2
(45) Date of Patent: Feb. 25, 2020

(54) BOP COMPACT BONNET-BOOSTER (CBB) PISTON ASSEMBLY AND METHOD

(71) Applicant: WORLDWIDE OILFIELD MACHINE, INC., Houston, TX (US)

(72) Inventors: Prakash Ramchandra Alhat, Pune (IN); Ashokkumar Alalasundaram, Singapore (SG)

(*) Notice: Subject to any disclaimer, the term of this patent is extended or adjusted under 35 U.S.C. 154(b) by 0 days.

(21) Appl. No.: 16/431,085

(22) Filed: Jun. 4, 2019

(65) Prior Publication Data

US 2019/0284897 A1   Sep. 19, 2019

Related U.S. Application Data

(62) Division of application No. 15/659,001, filed on Jul. 25, 2017, now Pat. No. 10,378,301.

(60) Provisional application No. 62/512,875, filed on May 31, 2017.

(51) Int. Cl.
   *E21B 33/06*   (2006.01)
   *F16K 51/00*   (2006.01)
   *F16K 31/122*  (2006.01)

(52) U.S. Cl.
   CPC ........ *E21B 33/063* (2013.01); *F16K 31/1225* (2013.01); *F16K 51/00* (2013.01)

(58) Field of Classification Search
   CPC ...... E21B 33/063; E21B 33/06–33/064; F16K 31/1225; F16K 51/00; F16K 31/122
   USPC ............... 251/1.1–1.3, 62–63.6; 166/85.4
   See application file for complete search history.

(56) References Cited

U.S. PATENT DOCUMENTS

| | | | | |
|---|---|---|---|---|
| 4,437,643 A | ‡ | 3/1984 | Brakhage, Jr. | ........ E21B 33/062 251/1.3 |
| 4,492,359 A | ‡ | 1/1985 | Baugh | .......... E21B 33/062 251/1.3 |
| 4,504,037 A | * | 3/1985 | Beam | ............. E21B 33/062 137/315.02 |
| 5,178,360 A | ‡ | 1/1993 | Young | .............. E21B 29/04 251/62 |
| 5,205,200 A | ‡ | 4/1993 | Wright | ........... F15B 15/1409 91/1 |
| 5,653,418 A | ‡ | 8/1997 | Olson | .............. E21B 33/062 251/1.3 |

(Continued)

FOREIGN PATENT DOCUMENTS

CN   201865613   ‡   6/2011

*Primary Examiner* — John Bastianelli
(74) *Attorney, Agent, or Firm* — Kenneth L. Nash; Thomas D. Nash

(57) ABSTRACT

A Compact Bonnet Booster (CBB) housing is monolithically formed to include an operating piston chamber, a booster piston chamber and two BOP bonnet end caps. When the CBB is assembled, the two BOP bonnet end caps contain bonnet hydraulic assemblies utilized to open and close the CBB housing with respect to a central BOP housing interior to change out the shear members. The CBB housing also defines therein hydraulic lines to open and close the wellbore utilizing the shear members as well as to operate the bonnet hydraulic assemblies. The CBB housing also incorporates a lifting pad eye near a center of gravity of said BOP. The CBB assembly also comprises a monolithically formed operating piston and corresponding shaft as well as a monolithically formed booster piston and corresponding shaft.

6 Claims, 7 Drawing Sheets

(56) References Cited

U.S. PATENT DOCUMENTS

| | | | | |
|---|---|---|---|---|
| 6,244,560 B1 ‡ | 6/2001 | Johnson | ................ | E21B 33/062 251/1 |
| 6,969,042 B2 ‡ | 11/2005 | Gaydos | ................ | E21B 33/062 251/1 |
| 7,374,146 B2 ‡ | 5/2008 | Whitby | ................ | E21B 33/062 251/1 |
| 8,132,777 B2 * | 3/2012 | Delbridge | ............. | E21B 33/062 166/319 |
| 2017/0107779 A1 ‡ | 4/2017 | Akhare | ................ | E21B 33/063 |

\* cited by examiner
‡ imported from a related application

BOP COMPACT BONNET-BOOSTER (CBB) PISTON ASSEMBLY AND METHOD

BACKGROUND OF THE INVENTION

Field of the Invention

The present invention relates generally to Blowout Preventers (BOP), Large Bore (LB) Bonnet with Integral Booster Assembly for shear rams and, more particularly, to a COMPACT BONNET-BOOSTER (CBB) piston assembly mounted between hydraulic actuators in bonnet end caps that contain hydraulic pistons used to open the rams to change out the shear members.

Background of the Invention

Blowout Preventers ("BOP") are frequently utilized in oilfield wellbore Christmas trees for pressure control involving shearing tubulars and closing off a wellbore. A BOP, or a BOP stack, may include a first set of rams for sealing off the wellbore and a second set of shear rams for cutting pipe such as tubing, wireline and/or intervention tools. Many different sets of rams may be utilized. BOP stacks can be quite bulky, heavy and expensive. With increasing size, BOP stacks typically become much more expensive for initial cost as well as for installation and removal.

Shear ram BOPs may frequently require maintenance after cutting pipe. In order to open the BOPs to change the shear members, hydraulic actuators located within bonnet end caps may be utilized.

BOPs utilize hydraulic pistons, referred to herein as operating pistons, to operate the rams, including the rams that utilize shearing members. The operating pistons for the BOP are often mounted between the bonnet caps that contain hydraulic pistons utilized to open the bonnets for access to the shearing members. For this reason, the diameter of the hydraulic pistons utilized to operate the shearing pistons for these types of BOPs is limited to a certain shearing force.

To cut larger pipe than can be cut by the operating pistons utilizing the maximum or optimum practical hydraulic fluid pressure, booster piston assemblies have been utilized in the past that are utilized in addition to the operating pistons. However, when the operating pistons are positioned between the bonnet caps, and the booster pistons are mounted axially thereto, the booster piston assemblies have been limited in size due to the limited distance between the bonnet caps. Accordingly, these types of certain prior art booster piston assemblies are also limited in diameter, which in turn limits the amount of force that can be produced by the booster pistons.

Further, the addition of certain booster piston assemblies on either side of the BOP results in the need to add external hydraulic lines that may be exposed to damage due to moving elements that may hit the BOPs and damage the hydraulic lines (e.g. items being lifted). Further, the existing overhang length of these additional boosters at either side of certain BOPs, are comparatively longer.

The following patents discuss background art related to the above discussed subject matter including examples of prior art booster piston assemblies:

U.S. Patent Application 20170107779 filed 20 Apr. 2017, to Prashant N. Akhare and Dennis D. George discloses a BOP booster assembly discloses a booster assembly that has three main components comprising a booster housing, piston, and end plate. An extension in the booster housing is sufficiently long to position the booster hydraulic cylinder axially outside of the ends of the bonnet caps of the BOP with respect to the wellbore. The booster piston is equal in diameter or larger than the operating piston of the BOP. The operating pistons and booster pistons move simultaneously, in sync, and the same distance for closing and cutting. In one embodiment, an internal hydraulic line is provided in the booster cylinder wall.

U.S. Pat. No. 6,244,560, issued Jun. 12, 2001, to Chris Johnson, discloses a ram actuating mechanism for a blowout preventer, the ram actuating mechanism including a hydraulic booster for enhancing the ram closing force. The ram actuating mechanism may be compatible for use with primary pistons which include internal moving components, such as self locking pistons. The ram actuating mechanism provides a hydraulic booster without increasing the diameter of the booster pistons above the diameter of the primary piston, such that BOP stack height need not be increased to accommodate a relatively large diameter hydraulic booster. The ram actuating mechanism may utilize the same piston housing as used by the primary piston, and the booster pistons may act mechanically in series upon the primary piston to increase axial ram closing force. The ram actuating mechanism may be capable of retro-fitting to existing ram actuating mechanisms.

U.S. Pat. No. 5,178,360, issued Jan. 12, 1993, to Terry Young, discloses a valve actuator or a booster module for an existing valve actuator that provides an incremental force to the valve stem at a position close to valve closure. The force is stored in a spring which is held in the compressed position by a collet. Upon sufficient movement of the valve actuator stem in the direction towards valve closure, the collet which had previously held the spring in a compressed position is freed to move to allow the spring to expand against the collet. Since movement of the collet has caused it to be engaged to the valve actuator stem, the spring forces are transmitted directly to the valve actuator stem via the collet. The spring is oriented in a direction substantially parallel to the valve stem so that substantially all of its retained energy is transmitted directly to the valve stem through the collet.

U.S. Pat. No. 5,205,200, issued Apr. 27, 1993, to John J. Wright, discloses a linear actuator used in moving, for example, gate valves, sluice gates and the like, wherein an increased thrust is required during initial movement. The present invention includes, as part of the linear actuator, a booster piston movably disposed about a piston rod; further included on the booster piston is a thrust column disposed radially between the booster piston and the piston rod so as to define an annular fluid channel for enabling fluid to move upwardly so as to contribute a substantial additional thrust component to move the primary piston.

U.S. Pat. No. 6,969,042, issued Nov. 29, 2005, to Stephen Gaydos, discloses a blowout preventer with a main body; a base releasably connected to the main body, the base having a base space therein, the base having a ram shaft opening; a primary piston movably disposed within the base space; a ram shaft to which the primary piston is connected, the ram shaft including a ram end and a piston end; a ram connected to the ram end of the ram shaft; a housing connected to the base, the housing having a housing space therein, the housing including a middle member with a member opening; a booster piston movably disposed within the housing space and having a booster shaft projecting therefrom and a booster shaft space therein; the shaft including a push portion selectively movable to abut the ram shaft to prevent movement of the ram shaft and to transfer force of the booster piston to the primary piston; and power fluid apparatus for the primary piston and the booster piston.

U.S. Pat. No. 7,374,146, issued May 20, 2008, to Whitby et al., discloses a hydraulic blowout preventer operator comprises a first piston rod coupled to a closure member. The operator further comprises a first operator housing coupled to a bonnet and a head. The first piston rod extends through the bonnet into the first operator housing where is couples to a first piston disposed within the first operator housing. The operator further comprises a second piston rod coupled to the closure member. The second piston rod has a longitudinal axis that is parallel to a longitudinal axis of the first piston rod. The second piston rod extends through the bonnet into a second operator housing and is coupled to a second piston that is disposed within the second operator housing.

Chinese Patent No. CN 201865613, issued Jun. 15, 2011, to Shanghai SK Petroleum & Chemical Equipment Corporation Ltd., discloses a combined oil cylinder for a ram preventer with a shearing function. The combined oil cylinder comprises a side door, a ram control hydraulic cylinder assembly, a shearing boosting hydraulic cylinder assembly and a hydraulic cylinder cover which are sequentially connected and installed. The ram control hydraulic cylinder assembly comprises a ram control hydraulic cylinder, a ram control piston and a ram control piston rod. The shearing boosting hydraulic cylinder assembly comprises a boosting hydraulic cylinder, a boosting piston and a boosting piston rod. The combined oil cylinder for the ram preventer with the shearing function provided by the present utility model ensures that the size and the weight of the ram preventer of a hinge switch side door are not increased, can simultaneously effectively increase the pushing force of the piston rod to shear a tube string in a well.

The above prior art does not disclose an integral, compact, lightweight bonnet booster piston assembly, yet with less overhang, concealed fluid porting with a fewer number of leak paths, and twice the force than the conventional LB bonnet, an integral lifting pad eye point onto the Compact Bonnet Booster (CBB) housing, which is nearer to the Center of Gravity (COG) of the BOP Assembly, as described in the present specification. Consequently, those skilled in the art will appreciate the present invention that addresses the above and/or other problems.

SUMMARY OF THE INVENTION

An object of the present invention is to provide an improved, BOP LB Bonnet with an integral booster piston assembly and method.

Yet another possible object of the present invention is to provide a compact BOP LB Bonnet with an integral booster assembly that can be assembled onto an existing BOP Body.

Yet another possible object of the present invention is to provide a reduced overhang LB Bonnet Booster piston assembly making it a Compact Bonnet Booster (CBB) that can be assembled onto an existing BOP Body.

Yet another possible object of the present invention is to provide a reduced size outer envelope of a Compact Bonnet Booster (CBB) assembly, when assembled onto an existing BOP Body.

Yet another possible object of the present invention is to provide a lower weight Compact Bonnet Booster (CBB) assembly, when assembled onto an existing BOP Body.

Yet another possible object of the present invention is to provide a lifting pad eye integral to the LB Bonnet, enabling the lifting point of the entire BOP to be closer to the Centre of Gravity (COG) of the BOP.

Yet another possible object of the present invention is to provide a BOP Compact Bonnet Booster (CBB) piston assembly that allows a smaller diameter BOP that can be utilized to cut pipe that in the past required a much larger and typically much more expensive BOP.

Yet another possible object of the present invention is to provide a method or system that provides a Compact Bonnet Booster (CBB) piston assembly for a 13⅝ inch BOP to make the BOP operable to shear the tubular portion of at least 6⅝ inch OD tubing, 27.5 pounds per foot (ppf), ½ inch wall thickness, and material grade S135 (rated to 135,000 psi).

Yet another possible object of the present invention is to provide a booster piston that is at least as large as the operating piston in diameter. The operating piston is the piston (or one of two pistons on each side of the BOP) assembled in the Large Bore Bonnet.

Yet another possible object of the present invention is to provide a simple design of an internal concealed hydraulic line that connects the back side of both the operating piston and the booster piston, to hydraulic fluid flow, (without any possible leak path of having hydraulic sub and seals), for closing and shearing purposes.

Yet another object of the present invention is to provide that the operating and booster pistons move simultaneously, in sync, and the same distance for closing and cutting.

These and other objects, features, and advantages of the present invention will become clear from the figures and description given hereinafter. It is understood that the objects listed above are not all inclusive and are only intended to aid in more quickly understanding the present invention, not to limit the bounds of the present invention in any way.

Accordingly, a Compact Bonnet Booster (CBB) piston assembly is provided for use with a BOP. The BOP comprises a central body. On one side of the BOP is a shear member and an operating piston to move the shear member between an open and closed position. The BOP is of a type wherein each bonnet on each side comprises two bonnet caps. The two bonnet caps contain hydraulics to open one of the bonnets for access to an interior of the central body. The operating piston is mounted between the two bonnet caps within an operating piston chamber. The operating piston chamber comprises an operating piston chamber outer wall.

In one embodiment, the Compact Bonnet Booster (CBB) piston assembly adjoining to the operating cylinder wall comprises a booster piston housing, booster piston and a booster cylinder wall that defines therein a booster piston chamber. The Compact Bonnet Booster (CBB), comprising operating piston chamber, operating cylinder wall, booster piston chamber, and bonnet end caps are monolithically formed as a metallic construction in a preferred embodiment.

A booster piston is mounted for reciprocal movement inside the booster piston chamber. The booster piston assembly may further comprise a piston and a booster outer piston shaft. In one embodiment, the booster piston, and the booster outer piston shaft are monolithically formed as a metallic construction.

The booster piston assembly may further comprise an integral booster housing with a booster piston chamber outer wall, and a booster end plate housing. The booster outer piston shaft extends into the booster end plate housing.

In one embodiment, the booster inner piston is positioned to engage with the operating piston outer shaft but is not fastened to the operating piston outer shaft when the Compact Bonnet Booster (CBB) assembly is secured to the BOP.

The booster piston comprises a diameter as large as a diameter of the operating piston.

In one embodiment, the operating cylinder wall defines a hydraulic line therein that receives hydraulic fluid to move the operating piston to a closed position. Simultaneously, a hydraulic line in the bonnet end caps therein that receives hydraulic fluid to move the booster piston to a closed position.

In one embodiment, the Compact Bonnet Booster (CBB) piston assembly is assembled for use with a 13⅝ inch BOP body to make the BOP operable to shear the tubular portion of at least 6⅝ inch OD tubing, 27.5 pounds per foot (ppf), ½ inch wall thickness, and material grade S135 (rated to 135,000 psi).

In another embodiment, the BOP comprises a BOP hydraulic connector in communication with the BOP operating piston chamber so that the BOP hydraulic connector extending from the BOP operating piston chamber is linked for connection to the booster hydraulic line connection.

One general aspect includes a bonnet booster assembly operatively connectable to a BOP central housing, the bonnet booster assembly including: a monolithically formed bonnet housing that defines therein an operating piston chamber, a booster piston chamber, and two bonnet hydraulic piston chambers. The booster piston chamber and the operating piston chamber are placed between the two bonnet hydraulic piston chambers. The bonnet booster assembly also includes an operating piston mounted within the operating piston chamber. The bonnet booster assembly also includes a push rod connected to the operating piston. The push rod extends into an interior of the BOP central housing. The bonnet booster assembly also includes an operating piston outer shaft on an opposite side of the operating piston from the push rod.

The monolithically formed bonnet housing includes a wall through which the operating piston outer shaft extends. The bonnet booster assembly also includes a booster piston mounted within the booster piston chamber. A bonnet open hydraulic piston assembly and a bonnet close hydraulic piston assembly are positioned within the two bonnet hydraulic piston chambers. The bonnet open hydraulic piston assembly and the bonnet close hydraulic piston assembly are connected to move the bonnet booster assembly with respect to the BOP central housing for access to the interior of the BOP.

Implementations may include one or more of the following features. The bonnet booster assembly in which the monolithically formed bonnet housing includes bonnet end caps for the two bonnet hydraulic piston chambers. The bonnet end caps extending entirely along a stroke length of the booster piston. The bonnet booster assembly further including wellbore operating piston open hydraulic fluid lines that fluidly connect with the bonnet open hydraulic fluid lines. Wellbore operating piston close hydraulic fluid lines and booster piston close hydraulic fluid lines that fluidly connect with the bonnet close hydraulic fluid lines.

One general aspect includes a bonnet booster assembly operatively connectable to a BOP central housing, the BOP central housing defining a wellbore through the BOP central housing. The BOP central housing comprising the bonnet booster assembly including: a monolithically formed bonnet housing that defines therein an operating piston chamber, a booster piston chamber, and two bonnet hydraulic piston chambers. The booster piston chamber and the operating piston chamber being placed between the two bonnet hydraulic piston chambers. The bonnet booster assembly also includes the monolithically formed bonnet housing defining therein bonnet open hydraulic fluid lines to urge the monolithically formed bonnet housing away from BOP central housing and also bonnet close hydraulic fluid lines to urge the monolithically formed bonnet housing into engagement with BOP central housing. The bonnet booster assembly also includes the monolithically formed bonnet housing defining therein wellbore open hydraulic fluid lines to urge closure members to open the wellbore and also wellbore close hydraulic fluid lines to urge the closure members to close the wellbore.

Implementations may include one or more of the following features. The bonnet booster assembly further includes wellbore operating piston open hydraulic fluid lines that fluidly connect with the bonnet open hydraulic fluid lines and further including wellbore operating piston close hydraulic fluid lines and booster piston close hydraulic fluid lines that fluidly connect with the bonnet close hydraulic fluid lines.

BRIEF DESCRIPTION OF THE DRAWINGS

The above general description and the following detailed description are merely illustrative of the generic invention. Additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
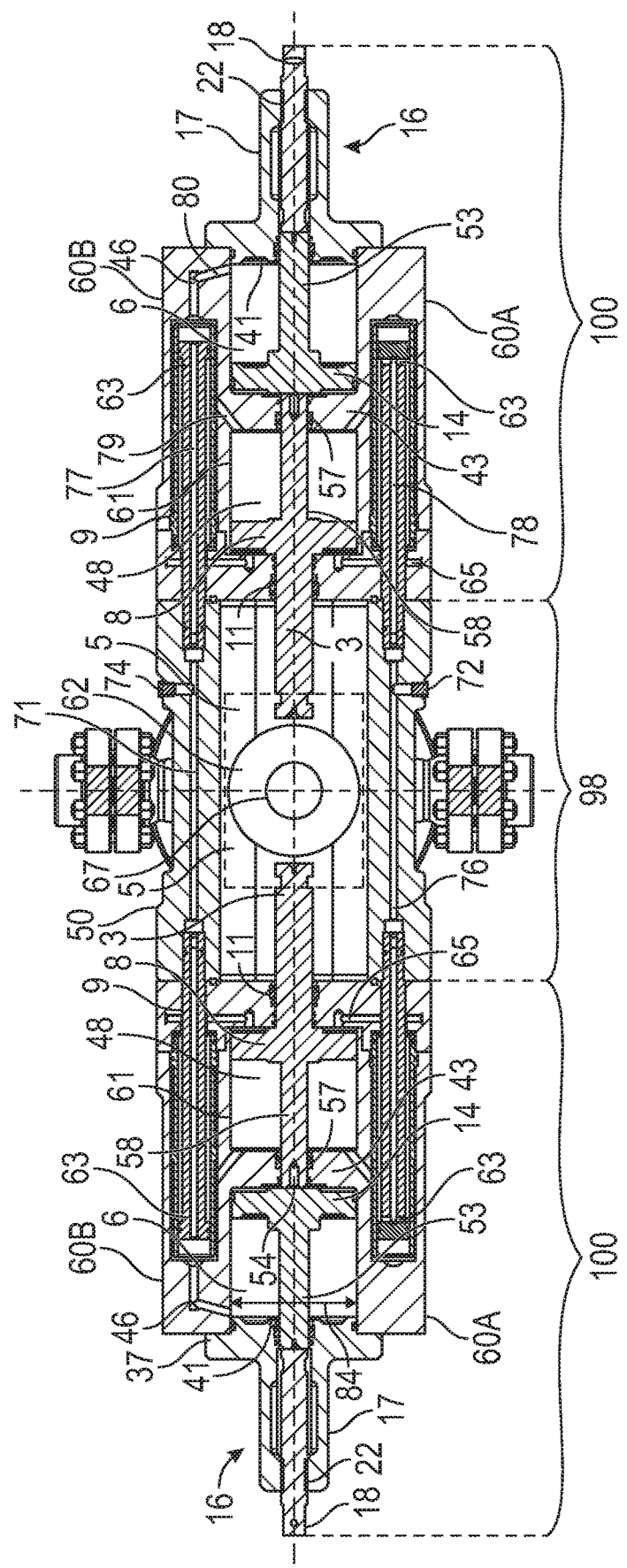
FIG. 1 is a plan view, in section, of a BOP shear ram along with Compact Bonnet Booster (CBB) piston assembly in accord with one possible embodiment of the present invention.
Figure 2:
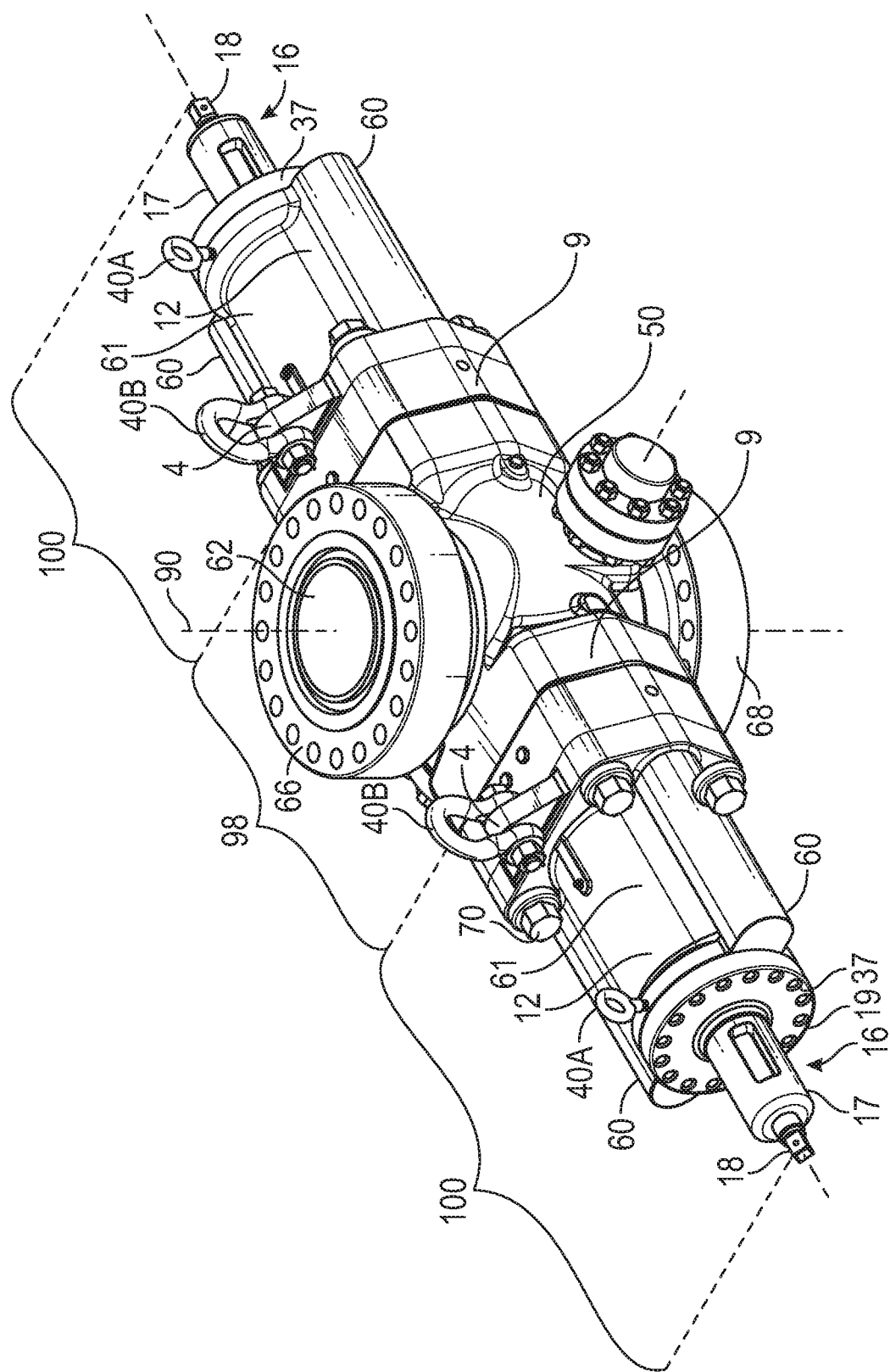
FIG. 2 is a perspective view of a BOP shear ram along with Compact Bonnet Booster (CBB) piston assembly in accord with one possible embodiment of the present invention.

Referring now to the drawings and more particularly to FIGS. 1 and 2, there is shown BOP Compact Bonnet Booster (CBB) piston assemblies 100 arranged on either side of BOP 98 as illustrated in FIG. 1 and FIG. 2. The two BOP Compact Bonnet Booster (CBB) piston assemblies on either side of the BOP are identical and the same numbers are used for like parts. Accordingly, it is necessary to discuss only one BOP Compact Bonnet Booster (CBB) piston assembly 100 such as that shown in FIGS. 4, 5, 6 and 7. Likewise, both sides of the BOP are substantially the same so that in some cases only one side of the BOP and associated bonnet assembly 100 is discussed.

The use of a Compact Bonnet Booster (CBB) piston assembly as described herein allows a smaller diameter BOP to cut pipe than that in the past which required a larger and more expensive BOP. For example in one embodiment, a Compact Bonnet Booster (CBB) piston assembly added to a 13⅝ inch BOP 98 can make the BOP operable to shear the tubular portion of at least 6⅝ inch OD tubing, 27.5 pounds per foot (ppf), ½ inch wall thickness, and material grade S135 (rated to 135,000 psi), which could be positioned as pipe 67 within wellbore 62. Otherwise an operator would require a much larger, heavier, BOP.

Returning to FIG. 1 and FIG. 2, shear ram BOP 98 comprises BOP central housing 50 which surrounds wellbore 62. For convenience, shear ram BOP may be referred to herein as BOP or the like. As shown in FIG. 2, upper and lower flanges 66 and 68 define wellbore 62 that extends through the BOP along axis 90. Push rods 3, which may also be referred to as the operating piston inner shaft or the like, each carry a shear member.

Shear members may be of many different configurations and are shown as shear members 5 (shown schematically in dash lines for clarity in the drawing) that connect to the push rods 3. The shear members 5 are pushed inwardly towards wellbore 62 to cut pipe 67 within the wellbore and seal the wellbore in a well-known manner. Shear members 5 may be referred to herein as closure members, shearing members, cutting members, and the like herein.

Intermediate Flange 9 is assembled onto the CBB Housing 12, also referred to herein as booster housing 12, which comprises the unique monolithically formed bonnet housing 12 utilizing fasteners (not shown). Seals 11 around push rod 3 prevent the wellbore fluid coming into CBB Operating Piston Chamber 48. Intermediate flange 9 is not part of the monolithically formed CBB housing 12.

Referring to CBB housing 12, by monolithically formed, it is meant that the item is forged and/or machined as one metal piece. Operating piston chamber 48 is preferably formed so that operating piston 8 is able to move full travel or 100% of the stroke length. However, if desired, the stroke length could be greater than 80% or any greater percentage.

Likewise booster piston chamber 6 is preferably formed so that booster piston 14 is able to move full travel or 100% of the stroke length. However, if desired, the stroke length could be greater than 80% or any greater percentage.

Compact Bonnet Booster (CBB) piston assembly 100 is mounted on either side of BOP body central housing 50. Compact Bonnet Booster (CBB) piston assembly can be opened hydraulically by the hydraulic mechanisms in bonnet caps 60A and 60B to change out the shear members 5.

Bonnet caps 60A and 60B may be referred to more generally herein as bonnet caps 60. As discussed in more detail in FIG. 8, bonnet caps 60A and 60B comprise cylinders that contain hydraulic assemblies used to slidably open and close BOP booster assembly 100 with respect to an interior of the BOP central housing of BOP 98 to change out shear members 5. Bonnet caps 60 define therein the entire or almost the entire stroke length or travel of bonnet hydraulic pistons 63 that perform this opening and closing function and comprise at least 80% of the stroke length or travel or any percentage of the stroke length or travel greater than 80% but could also comprise any stroke length less than 80%.

Compact Bonnet Booster (CBB) piston assembly 100 also defines therein corresponding operating piston housings 61 in which operating pistons 8 are mounted. Operating pistons 8 move reciprocally and are slidably mounted within operating piston housings 61 to move shear members 5 to the open and closed wellbore positions. The shear members are operable to shear tubulars or solid rods within wellbore 62, which extends through BOP 98.

Accordingly, shearing members 5 are placed opposing each other on the inner ends of push rods 3, which are connected to operating pistons 8. The hydraulically activated operating pistons cause the shear members 5 to cut, ram, crush or otherwise sever a pipe extending through wellbore 62 to effectively seal wellbore 62. In one embodiment, each push rod 3, piston 8, and operating piston shaft 58 are monolithically constructed as one solid metal component as illustrated. Operating piston shaft 58 is on an opposite side of operating piston 8 from piston rod 3. Piston rod 3 may be referred to herein as a piston rod, piston inner shaft or the like.

Bonnet caps 60 contain bonnet hydraulic pistons 63 that are utilized to open the bonnets to change out shearing members 5. For this purpose, bonnet bolts 70 (See FIG. 2) can be loosened and hydraulic fluid pumped into "Open" port 72 to move the Compact Bonnet Booster (CBB) piston assembly on one or both sides outward to allow access to the shearing members. Bonnet hydraulic pistons are commonly used on BOPs to allow more conveniently changing out the shearing members due to the heavy weight of the Compact Bonnet Booster (CBB) piston assembly. Otherwise lifting lines and/or cranes might be needed for this purpose with the need to pull apart the components and then align them to reinstall the Compact Bonnet Booster (CBB) piston assembly. Various cat lines and so forth may be used for lifting heavy shearing members 5 once the Compact Bonnet Booster (CBB) piston assembly are open.

It will be noted that operating piston housing 61 and operating piston 8 are positioned between bonnet end caps 60. Therefore operating piston 8 is limited in diameter by distance 84 (See left side of FIG. 1) between the bonnet end caps 60. In some cases, it would be desirable to provide additional force acting on push rods 3. As discussed above, booster pistons have been mounted within the bonnet caps 60 in the past but the booster pistons are then smaller in diameter than the operating pistons due to distance 84 and the necessary thickness of the booster piston chamber.

Figure 5:
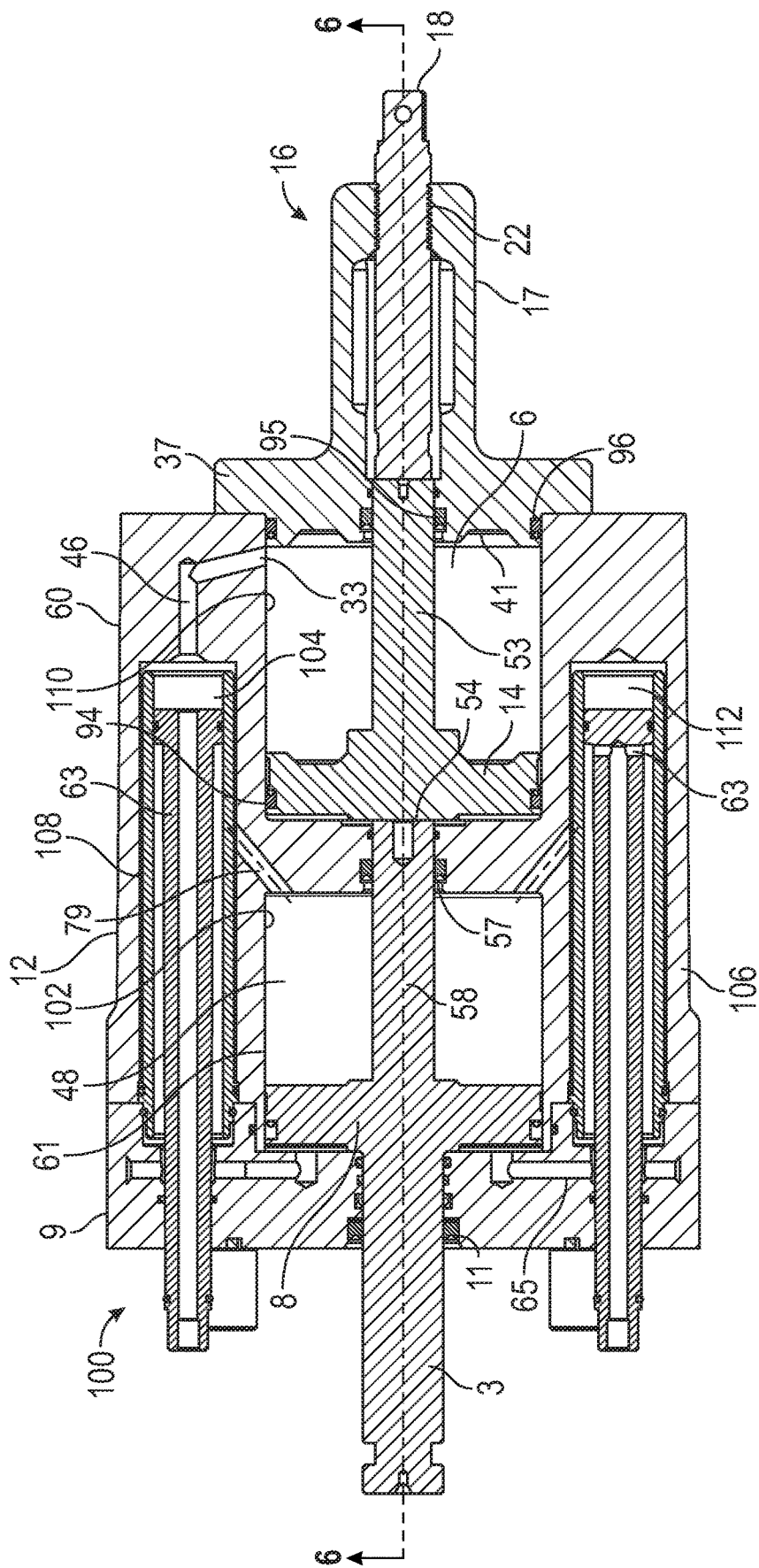
FIG. 5 is a plan view, in section, of a Compact Bonnet Booster (CBB) piston assembly, taken along sectional lines 6-6 in accord with one possible embodiment of the present invention.

Referring also to FIG. 5, in accord with the present invention, the booster piston is of the same diameter as that of the operating pistons and can be utilized in series. Booster piston 14 is contained within the portion of the booster housing 12 that defines booster piston chamber 6. Booster piston chamber 6 is sized to permit reciprocal motion of booster piston 14 that is the same distance but axially spaced from the reciprocal motion of operating piston 8. FIG. 5 shows booster piston cylinder walls 110 that define a cylindrical booster piston chamber 6, operating piston cylinder walls 102 that define an operating piston chamber 48, and two sets of bonnet hydraulic piston cylinder walls on either side of the bonnet housing that define two bonnet hydraulic piston chambers, namely open bonnet hydraulic piston chamber cylinder walls 106 that define open bonnet piston chamber 104 and close bonnet hydraulic piston chamber cylinder walls 108 that form close piston chamber 112. In other words, the monolithically formed bonnet housing defines therein an operating piston chamber, a booster piston chamber, and two bonnet hydraulic piston chambers. The booster piston chamber and said operating piston chamber are positioned between the two bonnet hydraulic piston chambers.

In a preferred embodiment, booster piston 14 comprises a monolithic piston and rod construction whereby piston 14, and outer shaft 53 are constructed in one monolithically forged and/or machined metal piece. Outer shaft 53 is monolithically formed on the outer side of piston 14 with respect to wellbore 62. The two components piston 14, and outer shaft 53 form a continuous metal construction e.g., forged and/or machined as a single metal component. In one embodiment of the present invention, the same seals used with operating piston 8 can also be used with booster piston 14.

At least the portion of booster housing 12 containing booster piston 14, namely booster piston chamber 6, is positioned radially outwardly from bonnet end caps 60 with respect to wellbore 62. Booster piston chamber 6 is the volume in which piston 14 is reciprocal allowing the stroke of booster piston 14. The region of reciprocal movement of booster piston 14 is the region of booster piston chamber 6 which is positioned radially outside the outer end of bonnet end caps 60 to allow the diameter of booster piston 14 to be the same diameter of operating piston 8.

Booster piston 14 and operating piston outer shaft 58 are axially aligned with each other to work in concert and move along the same axis together by the same amount to increase the shearing capability of shearing rams 5 during operation.

Operating piston outer shaft 58 extends through an opening in operating piston chamber outer wall 43. Shaft seal 57 in operating piston chamber outer end wall 43 seals around operating piston outer shaft 58 so that piston shaft 58 extends through booster piston chamber 6. In one embodiment, booster piston 14 and operating piston outer shaft 58 engage with each other but are not secured together. The booster piston 14 and operating piston outer shaft 58 engage with each other within booster housing 12.

The hydraulic fluid flow is shown diagrammatically and discussed again with respect to FIG. 8. However, in operation of this embodiment of the invention, to close shearing members or rams 5 of BOP Compact Bonnet Booster (CBB) piston assembly 100 and sever a tubular in wellbore 62, hydraulic fluid is introduced to opening 74 from a hydraulic source such as a "close" accumulator. The hydraulic fluid flows into the hydraulics of the corresponding bonnet end caps 60 (60A, 60B) and is directed to the outer portion of operating piston chamber 48 on the outer side of piston 8. The hydraulic force moves operating piston 8 inwardly towards wellbore 62. The hydraulic fluid also flows into the hydraulics of the corresponding bonnet end caps 60 (60A, 60B) and is directed to the outer portion of booster piston chamber 6 on the outer side of piston 14. The hydraulic force moves operating piston 14 inwardly towards wellbore 62.

Referring to FIG. 1 again, the hydraulic fluid also flows through bonnet end caps 60 through internal hydraulic line 46 to supply hydraulic fluid into outer booster piston chamber 6 on the outer side of booster piston 14. The hydraulic force moves booster piston 14 and operating piston shaft 58 inwardly. Booster piston 14 engages operating piston outer shaft 58 at operating piston shaft outer end 54. In a preferred embodiment, booster piston 14 is not fixedly attached to operating piston outer shaft 58. Using the combination of two axially oriented pistons, namely operating piston 8 and booster piston 14, essentially doubles the shearing force of shearing rams 5 assuming the two pistons have the same diameter and the same hydraulic pressure is utilized. The optimal or maximum hydraulic fluid pressure is limited but using multiple pistons provides twice the force without changing the hydraulic fluid pressure.

Figure 8:
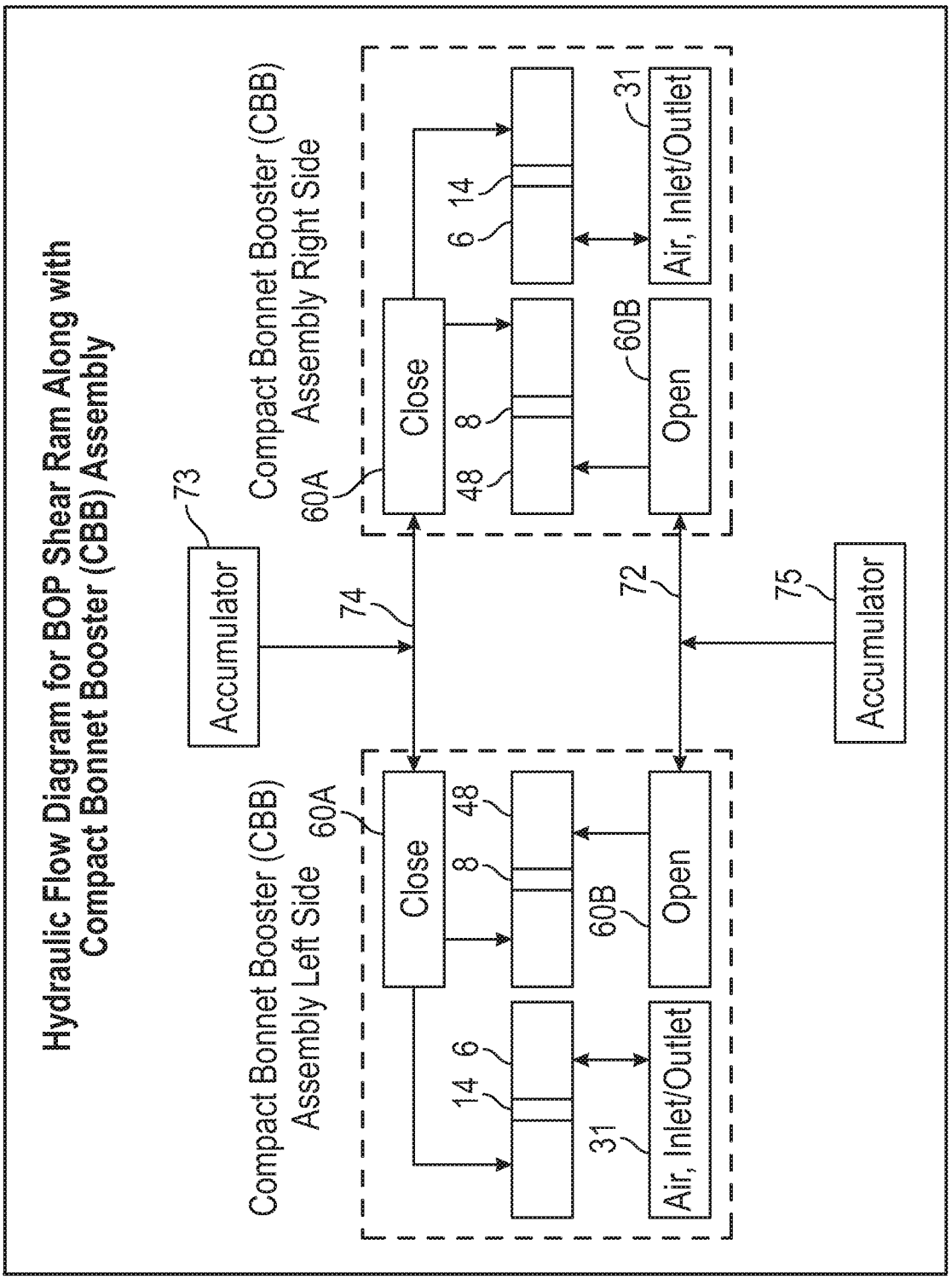
FIG. 8 is a hydraulic fluid flow path diagram in a BOP shear ram along with Compact Bonnet Booster (CBB) piston assembly.

By referring to FIG. 8, to open rams 5 of BOP Compact Bonnet Booster (CBB) piston assembly 100, hydraulic fluid is applied to port 72. The "open" hydraulic fluid source may be from an "open" accumulator or other source of hydraulic fluid. Hydraulic fluid goes to the corresponding hydraulics contained in corresponding bonnet end caps 60 from which the fluid is supplied to piston port 65, which may also be referred to herein as the wellbore open hydraulic line or wellbore operating piston open hydraulic fluid line elsewhere herein. Piston port 65 is positioned on the inner side of operating piston 8 closest to the wellbore and outer operating piston chamber 48. The hydraulic force moves or urges operating piston 8 outwardly from wellbore 62. Operating piston outer shaft 58 moves booster piston 14 outwardly so that closure members 5 are also moved to the open position and wellbore 62 is open. It is not necessary to direct fluid to the booster piston 14 for opening purposes since not as much force is required to move the pistons to the open position. Therefore, in this embodiment it is not necessary to utilize an additional hydraulic line to move the booster pistons 14 to the open position. The operation and hydraulic flow of booster piston assembly and operating piston 8 will also be described with reference to the hydraulic fluid flow diagram of FIG. 8.

Figure 6:
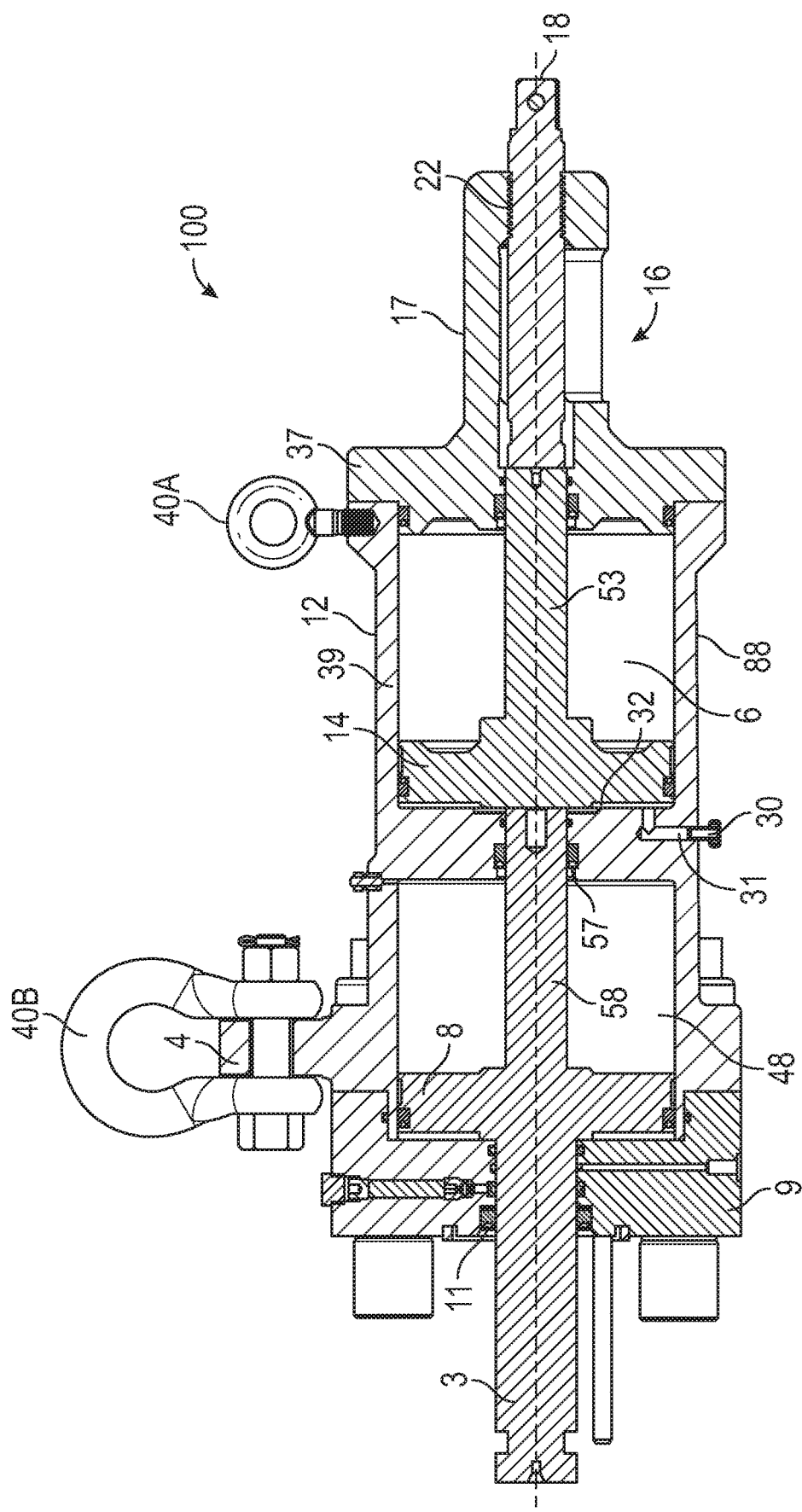
FIG. 6 is an elevational view, in section, of a Compact Bonnet Booster (CBB) piston assembly, taken along sectional lines 5-5 in accord with one possible embodiment of the present invention.

FIG. 2 depicts a perspective view of BOP booster piston assembly 100 as seen in FIG. 1 wherein BOP 98 with Compact Bonnet Booster (CBB) piston assembly 100 is assembled on both ends of BOP 98 opposite each other. The configuration of FIG. 2 utilizes the internal hydraulic line to supply fluid to the booster piston and avoids external hydraulic lines that could be broken during assembly or operation. Lifting Eyebolt 40A and Shackle 40B are used to assist in hoisting and placing Compact Bonnet Booster (CBB) assembly 100 in proper position with respect to BOP 98, as shown in FIG. 2 & FIG. 6. Lifting Pad Eyes 4 are provided integral onto the Compact Bonnet Booster (CBB) housing to receive Lifting Shackles 40B, for lifting the BOP Assembly. Lifting pad eyes 4 are formed near the center of gravity of Bonnet assembly 100 and/or within 30 inches of the center of gravity of the BOP bore.

FIG. 4, FIG. 5, FIG. 6 and FIG. 7 show an enlarged view of a preferred Compact Bonnet Booster (CBB) assembly 100 that has three main monolithic components discussed hereinbefore, namely the Compact Bonnet Booster (CBB) housing 12, booster piston 14 and its outer shaft 53, and booster end plate 16. While Compact Bonnet Booster (CBB) piston assembly 100 could be built differently, the preferred construction requires only three main components making assembly and disassembly quicker. The components made monolithic are believed to be the most efficient combinations to avoid the need for spacers, connectors, seals, fasteners and so forth as is used in the prior art.

Monolithically formed booster end plate or booster end plate 16 is preferably a monolithic construction of integral booster piston chamber outer wall 41, booster end plate flange 37, and booster end plate housing 17. End plate 16 is secured to Compact Bonnet Booster (CBB) housing 12 via flange 37 (see FIG. 4) utilizing fasteners 19. Booster end plate housing 17 includes internal threaded portion 22 (See FIG. 5 and FIG. 6) that provides a lock screw receptacle. Booster lock screw 18 can be inserted and rotated to manually lock the pistons and shear members in the closed position if desired.

Figure 7:
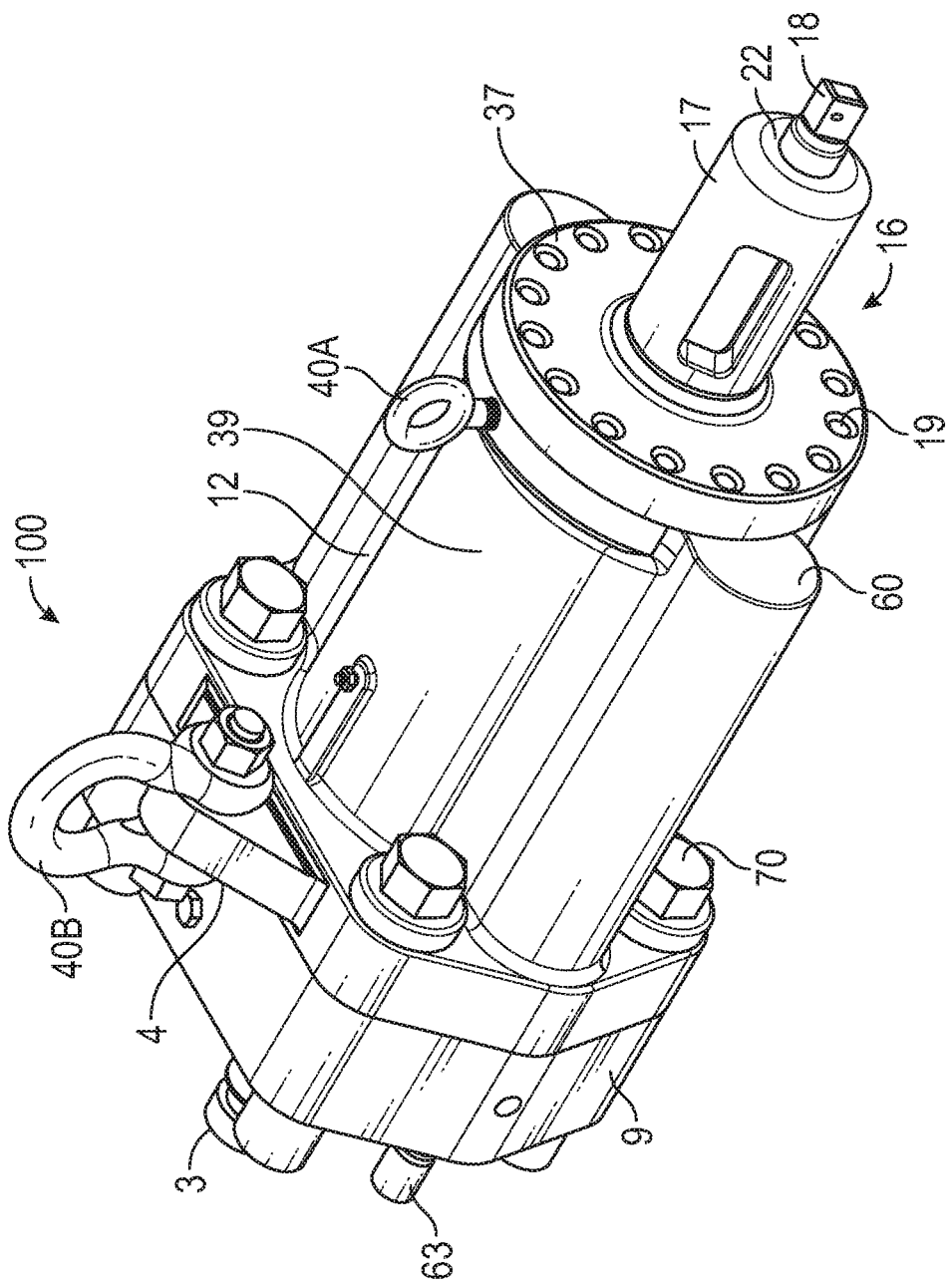
FIG. 7 is a perspective view of a Compact Bonnet Booster (CBB) piston assembly, in accord with one possible embodiment of the present invention.

FIG. 5 depicts a sectional view of Compact Bonnet Booster (CBB) piston assembly 100 whereas FIG. 7 is the outer perspective view. The hydraulic line connection 46 provides hydraulic fluid through booster cylinder port 33 to the outer side of booster piston chamber 6 on the outer side of booster piston 14 for energizing booster piston 14 to move to close the BOP. Booster cylinder port 33 is formed through bonnet caps 60. In this way, hydraulic fluid is introduced at the outermost side of booster piston chamber 6. As booster piston 14 is pushed inwardly towards the wellbore, fluid such as air, depending on the application, will be pushed through passageway 31 (See FIG. 6) and air breather filter 30 (See FIG. 6) to vacate the inner piston side of chamber 6. When inner face 32 of booster piston 14 is moved outwardly by operating piston outer shaft 58 as explained earlier, then the air flows through filter 30 and allows booster piston 14 to move outwardly and push hydraulic fluid out of one or more booster cylinder ports 33 back through internal line 46 that flows into operating piston housing 48 and then out through close valve port 74 (See FIG. 1). An overview of the hydraulic fluid system is shown in FIG. 8.

Figure 3:
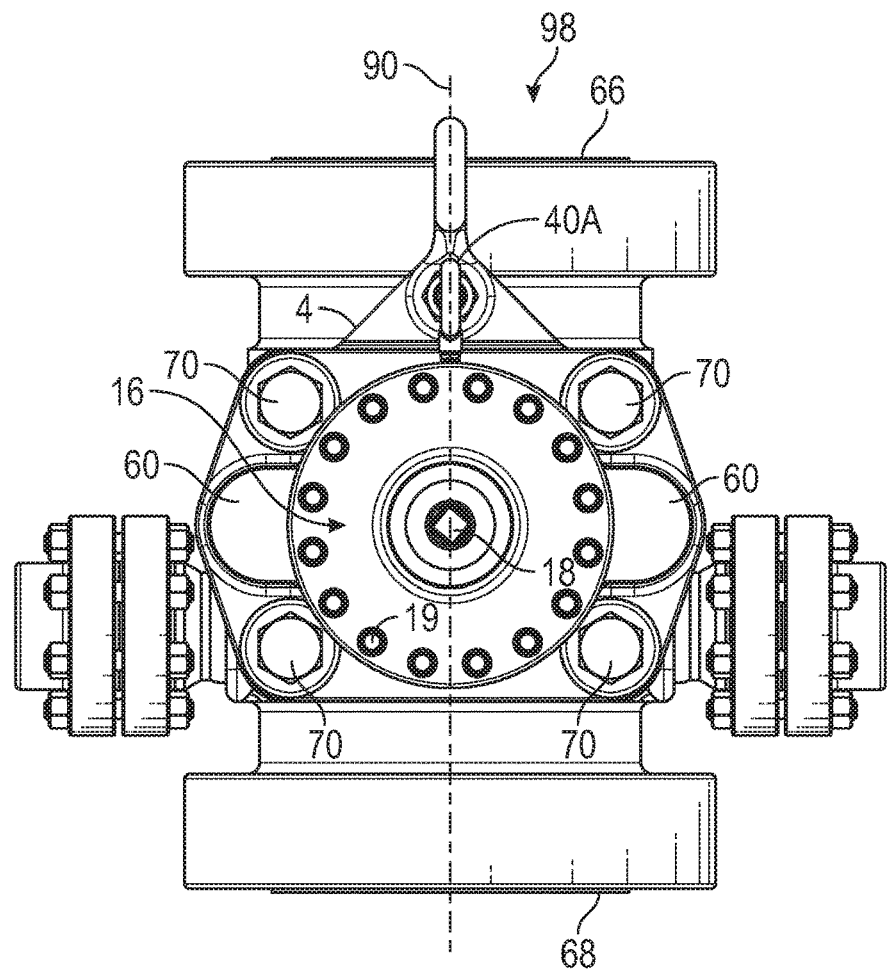
FIG. 3 is an elevational end view of a BOP shear ram along with Compact Bonnet Booster (CBB) piston assembly in accord with one possible embodiment of the present invention.
Figure 4:
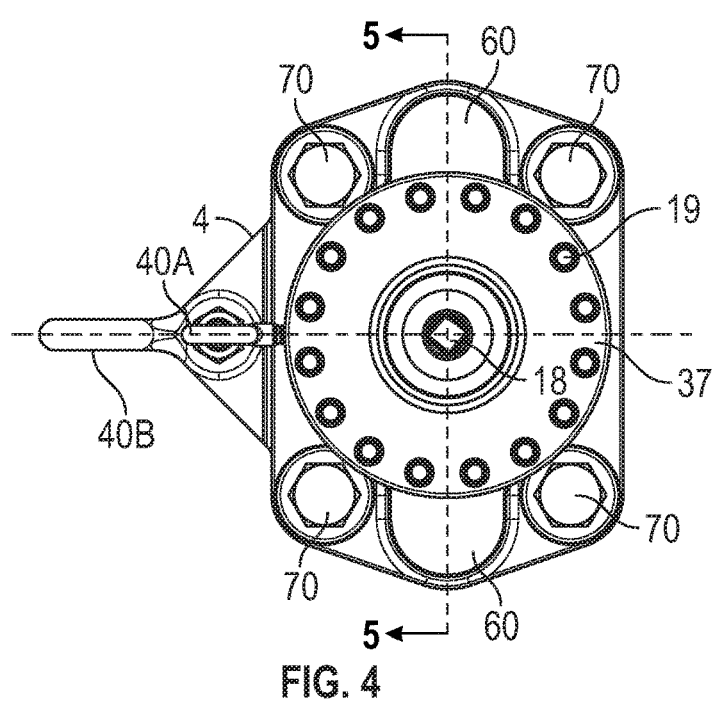
FIG. 4 is a side view, of a Compact Bonnet Booster (CBB) piston assembly, in accord with one possible embodiment of the present invention.

Turning to FIG. 3, an end view of a BOP booster assembly 100 is shown in accordance with the present invention. Upper flange 66 and lower flange 68 are utilized to secure BOP 98 into the BOP stack. Wellbore 62 extends through the upper and lower flanges. Booster end plate 16 is shown with optional lock screw 18 in position. Lock screw 18 may be utilized to manually lock the shear rams in the closed position by rotating lock screw to engage booster piston outer shaft 53 when booster piston 14 is in the closed position. Bolts 70 secure Compact Bonnet Booster (CBB) piston assembly onto BOP 98. As discussed above, bolts 70 may be removed so that the hydraulic assembly in bonnet end caps 60 can be utilized to open the bonnet to change out closure members 5 as is known to those of skill in the art. The outer circumference of Compact Bonnet Booster (CBB) housing 12 shown in FIG. 6 as distance 88 is greater than the distance between the bonnet end caps 60, which distance is shown in FIG. 1 as distance 84.

FIG. 5 shows a sectional view of Compact Bonnet Booster (CBB) piston assembly 100 whereas FIG. 7 shows an external view. Seals may be used in the integral booster assembly that are the same as those used with the operating piston. This may include booster piston seals 94, booster outer piston shaft seal 95 as it extends through the opening in booster piston outer wall 41 that is monolithically part of booster end plate flange 37. Seals 96 are provided to seal booster piston chamber 6 with booster housing end plate 16.

Booster piston 14 preferably comprises a monolithic piston and rod construction whereby piston 14 and outer shaft 53 are constructed as one metallic piece. Booster piston 14 engages operating piston shaft 58 at operating piston shaft outer end 54. The booster piston and operating piston are aligned with each other to work simultaneously with the same motion to increase the shearing capability of the shearing rams during operation. When the booster piston and operating piston are of the same diameter, the force is approximately doubled. In a preferred embodiment, booster piston 14 is not fixedly attached to operating piston outer shaft 58.

Looking to FIG. 8, the flow of hydraulic fluid and operation of BOP Compact Bonnet Booster (CBB) piston assembly is depicted. In this embodiment, a hydraulic source such as "close" accumulator 73 is activated to close the BOP rams. Another hydraulic source such as "open" accumulator 75 may be utilized to open the BOP rams. The same hydraulic ports 74 and 72 and flow lines can be utilized to open the BOP rams and to open the Compact Bonnet Booster (CBB) assembly to change out the shear members or close the BOP rams and close the CBB assembly into engagement with the central BOP housing.

Open hydraulic fluid lines 76 (see FIG. 1) in BOP central housing connects to fluid lines formed in the bonnet end caps 60B comprising and wellbore open hydraulic fluid lines 65. Essentially, wellbore open hydraulic fluid lines 65 fluidly connect to bonnet open fluid lines 78 and open hydraulic fluid lines 76 because in one embodiment all these fluid lines are utilized to open the rams to open the wellbore shearing members. As discussed herein bonnet open hydraulic fluid lines 78 open bonnet booster assembly 100 with respect to central BOP housing 50 to gain access to the interior thereof to change out the shear members 5.

Close hydraulic fluid lines 71 in BOP central housing fluidly connects to fluid lines formed in the bonnet end caps 60B comprising bonnet close hydraulic fluid lines 77 and wellbore close operating piston hydraulic fluid lines 79 and booster piston hydraulic fluid line 80. Line 79 and line 80, which are used to close shear member 5 are fluidly connected to hydraulic fluid line 77. Accordingly hydraulic fluid can be applied to port 74, which fluidly connects to hydraulic fluid line 77, which then fluidly connects to the fluid lines 79, 80 that lead to the operating piston chamber 48 and booster piston chamber 6, whereby the operating piston and booster piston are moved or urged inwardly to cut any pipe 67 and seal wellbore 62. As disclosed herein bonnet close hydraulic fluid lines 77 close bonnet booster assembly 100 with respect to central BOP housing 50 after gaining access to the interior thereof to change out the shear members 5. In other words, wellbore operating piston open hydraulic fluid lines 65 fluidly connect with bonnet open hydraulic fluid lines 78, and wellbore operating piston close hydraulic fluid lines 79 and booster piston close hydraulic fluid lines 80 fluidly connect with said bonnet close hydraulic fluid lines 77. More generally, hydraulic pressure is applied to wellbore open hydraulic fluid lines 65 to slidably urge closure members 5 to open the wellbore 62 and wellbore close hydraulic fluid lines 79, 80 are used to slidably urge the closure members 5 to close said wellbore.

In this description, the bonnet end caps 60 may be referred to herein as close bonnet end caps 60A that contain therein hydraulic systems to direct hydraulic fluid to close the rams and open bonnet end caps 60B that contain therein bonnet open hydraulic systems to direct hydraulic fluid to open the rams.

To close the rams, hydraulic fluid flows from "close" accumulator 73 to port 74 into the hydraulic elements within close end caps 60A. The hydraulic fluid is then directed to the outer sides of operating piston 8 and booster piston 14. Air escapes from the inner side of booster piston 14 through air breather 31 as the booster piston 14 is moved towards the well bore to close the rams. Hydraulic fluid on the inner side of operating piston 8 is expelled to accumulator 75. As discussed above, with the internal hydraulic line embodiment of FIG. 1-8, during closing the activating hydraulic fluid flows from the outer side of operating piston 8 to the outer side of booster piston 14.

To open the rams, hydraulic fluid flows from "open" accumulator 75 to port 72 to the hydraulic elements within open end caps 60B. The hydraulic fluid is then directed only to the inner side of operating pistons 8. Operating pistons 8 then move outwardly and the operating piston outer shaft 58 described hereinbefore push booster pistons 14 outwardly to the open position. Hydraulic fluid is expelled in the reverse direction to accumulator 73 as described above. Air is taken into the inner side of booster piston chamber 6 through inlet 31 as booster piston 14 is moved to the open position.

In other words, the bonnet end caps 60A, 60B comprise a bonnet open hydraulic piston assembly and a bonnet close hydraulic piston assembly.

Accordingly as discussed above, to close BOP 98 and sever a tubular or other member 67 in wellbore 62, "close" valve accumulator 73 moves hydraulic fluid through BOP 98 into an outer portion of operating piston chamber 48 thereby moving or urging operating piston 8 and booster piston 14 towards wellbore 62 to move shearing members 5 into engagement with each other with the tubular or other member therebetween. This action cuts the tubular and seals the wellbore.

In the internal hydraulic line embodiment of FIG. 1-8, hydraulic fluid flows from the outer portion of operating piston chamber 48 to the outer portion of booster piston chamber 6 through internal hydraulic line 46.

To open BOP 98, open accumulator 75 supplies hydraulic fluid into the inner portion of operating piston chamber 48 on the inner side of operating piston 8 to move operating piston 8 outwardly away from wellbore 62. This movement causes operating piston outer shaft 58 that is engaged with booster piston 14 to move both operating piston 8 and booster piston 14 outwards away from wellbore 62 to move the shearing members away from wellbore 62 to open the BOP rams.

The present invention is used with shear rams in BOPs that comprise hydraulic bonnets with hydraulically activated pistons inside the bonnet caps utilized to open the BOPs to change out the shear members. The use of a Compact Bonnet Booster (CBB) piston assembly as described herein allows a smaller diameter BOP that can be utilized to cut pipe that in the past required a much larger and typically much more expensive BOP.

As discussed above, the Compact Bonnet Booster (CBB) piston assembly has four main components that are believed constructed in the most efficient combination of parts and functions.

The first component of Compact Bonnet Booster (CBB) piston assembly 100 may comprise a monolithically formed bonnet booster housing 12 that attaches to BOP 98, a booster cylinder wall 39 that contains therein the entire booster cylinder chamber 6 in which the monolithic booster piston 14 along with booster outer shaft 53 reciprocates, Operating cylinder end wall 43 with the entire operating cylinder chamber 48 in which the monolithic operating piston 8 (inclusive of push rod 3 and outer shaft 58) along with operating outer shaft 58 and operating piston inner shaft 3 reciprocates.

The second component is a booster piston 14 monolithically incorporating an outer booster piston shaft 53 in a single metal construction. The inner booster piston 14 engages the operating piston outer shaft or operating piston shaft 58 of the operating piston 8. The outer booster piston shaft 53 extends through an opening in the booster housing end plate 16 to provide a visual indication of the open or close position and also can be locked in the close position with a lock screw 18.

The third component is a booster housing end plate 16 that monolithically incorporates the booster piston chamber outer wall 41 with hydraulic fluid lines therein and preferably forms a flange 37 for attachment to the Compact Bonnet Booster (CBB) housing. The booster housing end plate 16 further monolithically incorporates the booster end plate housing 17 with an opening for the outer booster piston shaft 53 and threads for the lock screw.

The fourth component is an operating piston 8 monolithically incorporating an outer operating piston shaft 58 along with an operating piston inner shaft (or push rod) 3 forming a single metal component.

In a preferred embodiment, only the operating piston 8 is connected to pressurized hydraulic fluid from the "open" accumulator for opening.

In a preferred embodiment, the same internal hydraulic lines within the BOP that can operate the Compact Bonnet Booster (CBB) to open the BOP is also used to supply hydraulic fluid for closing the operating piston 8 and booster piston 14.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. A bonnet booster assembly operatively connectable to a BOP central housing, said BOP central housing defining a wellbore through said BOP central housing, said bonnet booster assembly comprising:
   a monolithically formed bonnet housing that defines therein an operating piston chamber, a booster piston chamber, and two bonnet hydraulic piston chambers, said booster piston chamber and said operating piston chamber being placed between said two bonnet hydraulic piston chambers;
   said monolithically formed bonnet housing defining therein bonnet open hydraulic fluid lines fluidly connected to one of said bonnet hydraulic piston chambers to urge said monolithically formed bonnet housing away from said BOP central housing and also bonnet close hydraulic fluid lines fluidly connected to the other of said bonnet hydraulic piston chambers to urge said monolithically formed bonnet housing into engagement with said BOP central housing;
   said monolithically formed bonnet housing defining therein wellbore open hydraulic fluid lines to said urge closure members to open said wellbore and also wellbore close hydraulic fluid lines to urge said closure members to close said wellbore; and
   each closure member connected to both an operating piston mounted within said operating piston chamber and a booster piston mounted within said booster piston chamber.

2. The bonnet booster assembly of claim 1, further comprising wellbore operating piston open hydraulic fluid lines that fluidly connect with said bonnet open hydraulic fluid lines, and further comprising wellbore operating piston close hydraulic fluid lines and booster piston close hydraulic fluid lines that fluidly connect with said bonnet close hydraulic fluid lines.

3. The bonnet booster assembly of claim 2, further comprising fasteners to secure said monolithically formed bonnet housing to said BOP central housing, whereupon removal of said fasteners permits said monolithically formed bonnet housing to slidably move with respect to said BOP central housing.

4. The bonnet booster assembly of claim 1, further comprising said operating piston and an operating piston outer shaft and a piston rod that are monolithically formed in one piece, and said booster piston and booster piston outer shaft that are also monolithically formed from a single metal component.

5. The bonnet booster assembly of claim 4, further comprising a monolithically formed booster end plate housing, said monolithically formed booster end plate housing comprising a booster end plate flange and a lock screw receptacle operable to receive a lock screw that limits movement of said operating piston and said booster piston.

6. The bonnet booster assembly of claim 1, wherein said monolithically formed bonnet housing comprises an integral lifting pad eye positioned within thirty inches of a center of gravity of said BOP central housing.

\* \* \* \* \*